Sept. 6, 1932. H. E. CARLSON 1,875,988
CIGAR LOCATOR AND TRIMMER
Filed Sept. 26, 1931
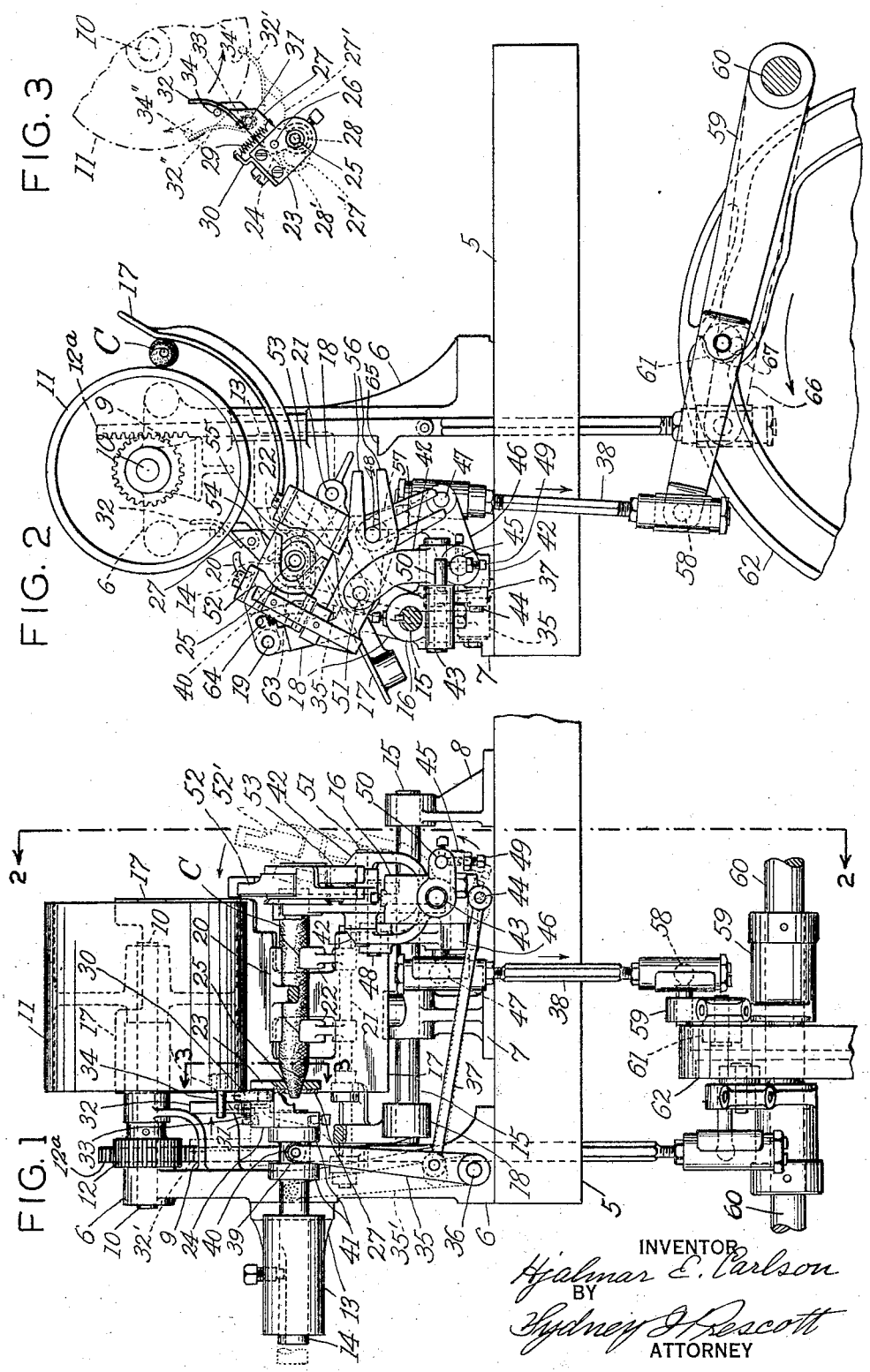
INVENTOR
Hjalmar E. Carlson
BY
Sydney J. Prescott
ATTORNEY Patented Sept. 6, 1932

1,875,988

UNITED STATES PATENT OFFICE

HJALMAR E. CARLSON, OF BROOKLYN, NEW YORK, ASSIGNOR TO INTERNATIONAL CIGAR MACHINERY COMPANY, A CORPORATION OF NEW JERSEY

CIGAR LOCATOR AND TRIMMER

Application filed September 26, 1931. Serial No. 565,376.

This invention relates to trimming devices for stogie and cheroot making machines, its object being to axially locate the bunch for final trimming, to cut its ends after being properly located, and to hold the wrapper tightly around the head end of the bunch while trimming the same.

In former trimming devices, the pointed head end of the cigar was located for trimming so as to project a given distance beyond the cutting edge of the trimmer, irrespective of the shape of the cigar end, with the result that the cut cigar ends varied considerably in diameter, thus presenting a bad appearance when the cigars were placed head up in a container. In the present trimmer, means are provided to locate the cigars in the trimmer in such a manner that their head ends are all cut at a given diameter of the pointed end portion irrespective of the distance of the cut from the end of the cigar, the said means at the same time serving as a ledger plate which acts to press the wrapper around the bunch at the cutting point, thus insuring a clean cut.

These objects in the present invention are achieved by making the head end trimmer movable in the axial direction and by providing the ledger plate of the same with a tapered aperture of the desired diameter so that in moving the trimmer against the cigar, the head end of the latter will enter the said hole to the given diameter and will then be adjacent the tuck end trimmer which likewise moves axially toward the cigar while its knives are open. Upon the cigar thus being located, both trimmers are operated, thereby trimming all cigars to the same length and to the same head end diameter. The tapered aperture in the head end ledger plate, fitting closely around the wrapper when the cigar is in trimming position, holds the wrapper in place during the cutting operation and thus insures a clean, smooth cut. The trimmers are advanced toward the cigar either by a sliding or a swinging to and fro motion imparted to the same by suitable means, and the cutters are operated from one or more of the moving parts of the cigar machine in any convenient manner. With these and other objects not specifically mentioned in view, the invention consists in certain constructions and combinations which will be hereinafter fully described and then specifically set forth in the claims hereunto appended.

In the accompanying drawing, which forms a part of this specification and in which like characters of reference indicate the same or like parts, Fig. 1 is a front elevation of the improved locating and trimming device; Fig. 2 is a side elevation of the same, taken on line 2—2 of Fig. 1; and Fig. 3 is a side elevation of the tuck end trimmer seen from line 3—3 of Fig. 1.

In carrying the invention into effect there is provided in combination with cigar supporting devices permitting axial movement of the cigar, a locator having an aperture therein and forming a ledger plate, means for giving said locator an axial or endwise movement toward the cigar to a predetermined position to cause said aperture to engage and locate the cigar, and mechanism coacting with said ledger plate for trimming the end of the located cigar whereby corresponding ends of the cigar are trimmed to a predetermined size and the wrapper is securely held during cutting. In the best constructions the said means include an element having a to and fro movement endwise of the cigar carrying said locator and the mechanism includes cutting devices mounted on said element for axial movement in unison with the locator. In the best constructions the means for trimming the end of the located cigar includes cutting devices at each end of the cigar having a to and fro motion endwise of the cigar thereby cutting the cigar to a uniform length as well as cutting one end to a uniform diameter. The various means referred to may be varied widely in construction within the scope of the claims, for the particular device selected to illustrate the invention is but one of many possible concrete embodiments of the same. The invention therefore is not to be restricted to the precise details of the structure shown and described.

Referring to the drawing, the table 5 of the cigar machine supports the bearing stand 6 and the pedestals 7 and 8. In the top of the stand 6, which has the bracket 9, is journaled a shaft 10 carrying the re-roller 11 oscillated by a gear 12 actuated by a reciprocating rack 12a. On one side the stand 6 carries a bearing 13 in which is slidably mounted a shaft 14 carrying the head end trimmer. The pedestals 7 and 8 support a stationary shaft 15 carrying a bracket 16 on which is pivotally mounted the tuck end trimmer. The shaft 15 also carries a lug, not shown, on which one end of the cigar cradle 17 is pivotally supported, its other end being resiliently fastened to a post affixed to the table 5. On shaft 15 is further mounted a forked bracket 18 one end of which supports a shaft 19 carrying a cigar holding finger 20 while the other end supports a shaft 21 carrying cigar holding fingers 22. To the shafts 19 and 21, during the operation of the machine, are imparted oscillating motions which close the fingers 20 and 21 at the proper time to hold the cigar while being trimmed.

The head end trimmer consists of a ledger plate 23, Figs. 1 and 3, attached to an L shaped block 24 clamped to the sliding shaft 14, the ledger plate 23 having a tapered hole 25 of the diameter to which it is desired to trim the mouth end of the cigar C. To a pin 26 in ledger plate 23 is pivoted a knife blade 27 having a circular cutting hole 28 held in registration with the locating hole 25 of plate 23 by a spring 29 anchored to a bracket 30 attached to block 24, the spring 29 pulling the outwardly extending end of blade 27 against the horizontally projecting portion of block 24. The extending end of blade 27 carries a screw 31 to which is pivotally fastened a curved extension 32 held against blade 27 by a torsion spring 33. The blade 27 is actuated by a pin 34 projecting axially from the rim of the re-rolling drum 11, the pin 34 in the counter clockwise movement of the re-roller engaging the extension 32 and turning the blade 27 clockwise about pin 26 until the blade has reached the dotted position 27′ in which, upon its cutting hole 28′ having cleared the ledger plate hole 25, its extension 32′ passes under the pin then in position 34′ and, by virtue of spring 29, snaps back into the open position shown in full lines in Fig. 3. When the actuating pin 34, upon the return stroke of the re-roller, engages with the under side of extension 32, it lifts the latter against the action of the torsion spring 33 into position 32″ from which, after the passage of the pin beyond position 34′, the extension 32″ snaps back into the normal position 32.

The shaft 14 is moved back and forth in the bearing 13 by a lever 35, Figs. 1 and 2, pivoted on a stud 36 in bearing stand 6 and actuated through a connecting rod 37 by the operating rod 38 of the tuck end trimmer. The free upper end of the lever 35 carries a pin 39 on which is mounted a roller 40 engaging the shoulders 41 of the shaft 14. When the lever 35 is in the dotted position 35′, Fig. 1, the blade extension 32 on block 24 is in position 32′, beyond the reach of pin 34.

The tuck end trimmer is mounted on a forked bracket 42 pivoted on a stud 43 carried by the bracket 16 on the shaft 15, the bracket 42 having a stud 44 for the connection of rod 37, and a stud 45 on which is mounted one end of an angle lever 46 carrying a ball joint 47 for the connection of rod 38 at its angle point and a pin 48 at the other end. Stud 45 also carries an adjustable stop screw 49 adapted to engage with a stationary pin 50 attached to the bracket 16. On the shaft 51 carried by the forked ends of bracket 42 are pivoted the knife holders 52 and 53 carrying the knives 54 and 55 respectively, each knife holder having a slotted arm, 56 and 57 respectively, engaging with the pin 48 in angle lever 46.

When the rod 38 is pulled downwards by a ball pin 58 in cam lever 59, which is fulcrumed on a shaft 60 and which has a roller 61 engaging with a track of cam 62, the bracket 42 turns on the stud 43 until the stop screw 49 engages with pin 50, thereby moving the trimmers from the dotted positions 32″ and 52″ shown in Fig. 1 to the full line positions 32 and 52, the head end trimmer 32 being pulled inward by the rod 37 attached to bracket 42. Upon the engagement of the stop screw 49, the further downward movement of rod 38 turns the angle lever 46 with its pin 48 around stud 45, thereby depressing arm 56 and raising arm 57, thus operating the tuck end knives 54 and 55.

The cigar C, which is delivered from the wrapper applying device of the cigar machine onto the cradle 17 by a swinging transfer arm, after being rolled back and forth on the cradle 17 a number of times by the roller drum 11, is discharged onto the fingers 22 while the trimmers are in the open positions 32′ and 52′. Then when the trimmers, with the knives open, are moved into the full line positions 32 and 52 as heretofore described, the ledger plate 23 of the head end trimmer 32 engages with the head end of the cigar C and locates the same on the fingers 22 with the head of the cigar snugly fitting in the hole 25 of plate 23. While the inward movement of shaft 14 takes place, the arm of finger 20, which in the dotted position of trimmer 32 rests on a roller 63, Fig. 2, carried by studs 39 of lever 35, is pulled downwards by a spring 64, thus holding the cigar between the fingers 20 and 22. The cigar C thus being held in its located position, the pin 34 on roller 11 engages the trimmer 32 and cuts the head end, while the knives 54 and 55, actuated by the continued downward movement of rod 38 produced by the turning of cam 62, cuts the tuck end, the brackets 16 and 42 being axially adjusted on shaft 15 so that the trimmed cigar is of the exact length desired. Upon thus trimming the cigar, the shaft 14 returns to its outer or dotted position, thereby lifting finger 20 into the position shown in Fig. 2 by means of roller 63 on lever 35, and finally the fingers 22 are momentarily depressed by turning shaft 21 against the action of a spring by the engagement of a dog 65 attached to the reciprocating rack 12a which is connected to a cam lever 66 fulcrumed on shaft 60 and carrying a cam roller 67 engaging in a cam track in the other face of the cam 62, thereby actuating the gear 12 of roller 11, thus causing the finished cigar to be discharged by rolling down on cradle 17 in timed relation with the operation of the locator and trimmer. As soon as the fingers 22 then have snapped back into holding position, the trimmers are ready for the next cigar discharged by the re-roller.

What is claimed is:

1. In a cigar machine, the combination with cigar supporting devices permitting axial movement of the cigar, of a locator having an aperture therein and forming a ledger plate, means for giving said locator an axial movement toward the cigar to a predetermined position to cause said aperture to engage and locate the cigar and mechanism coacting with said ledger plate for trimming the end of the located cigar whereby corresponding ends of the cigars are trimmed to a predetermined size.

2. In a cigar machine, the combination with cigar supporting devices permitting axial movement of the cigar, of a locator having an aperture therein and forming a ledger plate, means for giving said locator an axial movement toward the cigar to a predetermined position to cause said aperture to engage and locate the cigar and mechanism coacting with said ledger plate for trimming the end of the located cigar whereby corresponding ends of the cigars are trimmed to a predetermined size, said devices including grippers lightly gripping the cigar.

3. In a cigar machine, the combination with cigar supporting devices permitting axial movement of the cigar, of a locator having an aperture therein and forming a ledger plate, means for giving said locator an axial movement toward the cigar to a predetermined position to cause said aperture to engage and locate the cigar and mechanism coacting with said ledger plate for trimming the end of the located cigar whereby corresponding ends of the cigars are trimmed to a predetermined size, said means including an element having to and fro movement endwise of the cigar and carrying said locator, and said mechanism including cutting devices mounted on said element.

4. In a cigar machine, the combination with cigar supporting devices permitting axial movement of the cigar, of a locator having an aperture therein and forming a ledger plate, means for giving said locator an axial movement toward the cigar to a predetermined position to cause said aperture to engage and locate the cigar and mechanism coacting with said ledger plate for trimming the end of the located cigar whereby corresponding ends of the cigars are trimmed to a predetermined size, said mechanism including cutting devices at each end of the cigar, the devices at each end having a to and fro motion endwise of the cigar.

5. In a cigar machine, the combination with cigar supporting devices permitting axial movement of the cigar, of a locator having an aperture therein and forming a ledger plate, means for giving said locator an axial movement toward the cigar to a predetermined position to cause said aperture to engage and locate the cigar and mechanism coacting with said ledger plate for trimming the end of the located cigar whereby corresponding ends of the cigars are trimmed to a predetermined size, mechanism having a moving part operating to deliver cigars to said devices and a device on said moving part and cooperating with said cutting mechanism to operate the same.

6. In a cigar machine, the combination with cigar supporting devices permitting axial movement of the cigar, of a locator having an aperture therein, means for giving said locator an axial movement toward the cigar to a predetermined position to engage and locate the cigar and mechanism for trimming the end of the located cigar said means including an element having a to and fro movement endwise of the cigar and carrying said locator, and said mechanism including cutting devices also carried by said element.

7. In a cigar machine for making cigars with tapered ends, the combination with cigar supporting means, of a locator having a tapered aperture to fit the cigar end and acting as a ledger plate, means for giving said locator and cigar relative movement endwise of the cigar to cause the locator aperture to firmly embrace the tapered portion of the cigar end, a cutter coacting with said ledger plate for trimming said end, means for transferring cigars to said supporting means, and mechanism for operating said transferring means, said locator and said cutter in timed relation.

In testimony whereof, I have signed my name to this specification.

HJALMAR E. CARLSON.